United States Patent
Song (10) Patent No.: US 10,018,382 B2
(45) Date of Patent: Jul. 10, 2018

(54) SIX-WAY DIRECTIONAL VALVE, OUTDOOR UNIT FOR AIR CONDITIONER HAVING THE SAME, AND AIR CONDITIONER

(71) Applicants: GD MIDEA HEATING & VENTILATING EQUIPMENT CO., LTD., Foshan (CN); MIDEA GROUP CO., LTD., Foshan (CN)

(72) Inventor: Rui Song, Foshan (CN)

(73) Assignee: GD Midea Heating & Ventilating Equipment Co., Ltd., Foshan (CN)

( * ) Notice: Subject to any disclaimer, the term of this patent is extended or adjusted under 35 U.S.C. 154(b) by 6 days.

(21) Appl. No.: 15/509,955

(22) PCT Filed: Jun. 24, 2015

(86) PCT No.: PCT/CN2015/082244
§ 371 (c)(1),
(2) Date: Mar. 9, 2017

(87) PCT Pub. No.: WO2016/192146
PCT Pub. Date: Dec. 8, 2016

(65) Prior Publication Data
US 2017/0299233 A1    Oct. 19, 2017

(30) Foreign Application Priority Data

Jun. 1, 2015  (CN) .......................... 2015 1 0294038
Jun. 1, 2015  (CN) .................... 2015 2 0367461 U (51) Int. Cl.
*F25B 13/00* (2006.01)
*F16K 11/07* (2006.01)
*F16K 31/363* (2006.01)

(52) U.S. Cl.
CPC .............. *F25B 13/00* (2013.01); *F16K 11/07* (2013.01); *F16K 31/363* (2013.01); *F25B 2313/0276* (2013.01)

(58) Field of Classification Search
None
See application file for complete search history.

(56) References Cited

U.S. PATENT DOCUMENTS 3,411,538 A     11/1968  Gruner et al.
5,626,030 A *   5/1997   Nagai ....................... F16K 1/54
                                                    137/599.11

(Continued)

FOREIGN PATENT DOCUMENTS

CN         1121161 A       4/1996
CN       102654323 A       9/2012

(Continued)

OTHER PUBLICATIONS

PCT/CN2015/082244 English Translation and brief summary of International Search Report dated Mar. 7, 2016, 4 pages.

(Continued)

*Primary Examiner* — Mohammad M Ali
(74) *Attorney, Agent, or Firm* — Lathrop Gage LLP (57) ABSTRACT

A six-way directional valve (100), an outdoor unit (1000) having the same and an air conditioner are provided. The six-way directional valve (100) includes: a valve body (1), defining a valve cavity (5) therein, the valve cavity (5) having a first side wall (11) and a second side wall (12) disposed oppositely to each other, the valve body (1) being provided with a first connecting pipe (A) to a sixth connecting pipe (F); a valve spool (2), movably disposed in the valve cavity (5), a first chamber (21) being defined between the valve spool (2) and the first side wall (11), a second chamber (22) being defined between the valve spool (2) and the second side wall (12), and a third chamber (23) being (Continued)

defined between the valve spool (2), the first side wall (11) and the second side wall (12); and a pilot valve assembly (4).

20 Claims, 4 Drawing Sheets

(56) References Cited

U.S. PATENT DOCUMENTS

| | | | | |
|---|---|---|---|---|
| 5,634,352 | A * | 6/1997 | Nagai | F16K 11/065 62/278 |
| 6,250,202 | B1 * | 6/2001 | Buttner | F15B 20/002 60/399 |
| 7,367,352 | B2 | 5/2008 | Hagen et al. | |
| 8,505,580 | B2 * | 8/2013 | Ary | F16K 11/0856 137/625.43 |
| 2001/0032461 | A1 * | 10/2001 | Biggi | B62D 5/093 60/384 |
| 2008/0034765 | A1 * | 2/2008 | Takegami | F25B 13/00 62/175 |
| 2009/0113991 | A1 * | 5/2009 | Saito | G01N 30/06 73/31.02 |
| 2011/0185797 | A1 * | 8/2011 | Sakai | G01N 30/18 73/61.56 |
| 2012/0151909 | A1 * | 6/2012 | Hacker | F15B 11/165 60/445 |

FOREIGN PATENT DOCUMENTS

| | | |
|---|---|---|
| CN | 102853114 A | 1/2013 |
| GB | 644212 A | 10/1950 |
| JP | H08170865 | 7/1996 |

OTHER PUBLICATIONS

Chinese Application No. 201510294038.9 First Office Action dated Oct. 19, 2016, with English summary, 12 pages.

* cited by examiner

SIX-WAY DIRECTIONAL VALVE, OUTDOOR UNIT FOR AIR CONDITIONER HAVING THE SAME, AND AIR CONDITIONER

CROSS-REFERENCE TO RELATED APPLICATIONS

This U.S. application claims priority under 35 U.S.C. 371 to, and is a U.S. National Phase application of, the International Patent Application No. PCT/CN2015/082244, filed Jun. 24, 2015, which claims the benefit of prior Chinese Application No. 201510294038.9, filed Jun. 1, 2015 and No. 201520367461.2 filed Jun. 1, 2015. The entire contents of the above-mentioned patent applications are incorporated by reference as part of the disclosure of this U.S. application.

FIELD

The present disclosure relates to a technical field of refrigeration equipment, and more particularly to a six-way directional valve, an outdoor unit for an air conditioner having the same and an air conditioner.

BACKGROUND

In related technologies, two four-way directional valves are usually connected in series in an air conditioner to achieve directional circulation of the refrigerant in the air conditioner. However, installing the two four-way directional valves in series increases the cost of the directional valve.

SUMMARY

Embodiments of the present disclosure seek to solve at least one of the problems existing in the related art to at least some extent. For that reason, the present disclosure provides a six-way directional valve, which may reduce the cost of the directional valve to some extent.

Another objective of the present disclosure is to provide an outdoor unit for an air conditioner, and the outdoor unit includes the above-mentioned six-way directional valve.

Another objective of the present disclosure is to provide an air conditioner including the above-mentioned outdoor unit.

The six-way directional valve according to the present disclosure includes a valve body, the valve body defining a valve cavity therein, the valve cavity having a first side wall and a second side wall disposed oppositely to each other, the valve body being provided with a first connecting pipe to a sixth connecting pipe; a valve spool, movably disposed in the valve cavity, in which two valve chambers are defined between two moving ends of the valve spool and an inner circumferential wall of the valve cavity, so that the valve spool is driven to move by a pressure difference between the two valve chambers, a first chamber is defined between the valve spool and the first side wall, a second chamber is defined between the valve spool and the second side wall, a third chamber is defined between the valve spool, the first side wall and the second side wall, the first connecting pipe is normally communicated with the first chamber, the second connecting pipe is normally communicated with the second chamber, the valve spool moves so that one of the third connecting pipe and the fourth connecting pipe is communicated with the first chamber and the other one is communicated with the third chamber, and one of the fifth connecting pipe and the sixth connecting pipe is communicated with the second chamber and the other one is communicated with the third chamber; and a pilot valve assembly, communicated with the two valve chambers, so as to switch pressures in the two valve chambers.

The six-way directional valve according to the present disclosure is provided with the first connecting pipe to the sixth connecting pipe, and the valve spool is movably disposed in the valve cavity to achieve a directional control function of the six-way directional valve, thus avoiding the use of a plurality of four-way valves in an outdoor unit to achieve the same effect as the six-way directional valve, reducing the cost of the directional valve to some extent and simplifying the connection of pipes in the outdoor unit.

According to some embodiments of the present disclosure, the first connecting pipe, the third connecting pipe and the fourth connecting pipe are respectively disposed to the first side wall, and the second connecting pipe, the fifth connecting pipe and the sixth connecting pipe are respectively disposed to the second side wall.

In some embodiments of the present disclosure, the valve spool includes: two barrier blocks spaced apart from each other, the two valve chambers being defined between the two barrier blocks and the inner circumferential wall of the valve cavity respectively; and a sliding block, disposed between the two barrier blocks and connected to the two barrier blocks through a connecting rod, the first chamber being defined between the sliding block and the first side wall, the second chamber being defined between the sliding block and the second side wall, and the third chamber being defined between the sliding block, two connecting rods, the two barrier blocks and the inner circumferential wall of the valve cavity.

Optionally, the two barrier blocks, the sliding block and the two connecting rods are an integrally formed member.

According to some embodiments of the present disclosure, the valve body has a circular cross section.

The outdoor unit for an air conditioner according to the present disclosure has an outdoor unit output port and an outdoor unit input port, and the outdoor unit includes a compressor, having an air exhaust port and an air return port; the above-mentioned six-way directional valve, the first connecting pipe being connected to the air exhaust port, the second connecting pipe being connected to the air return port, the third connecting pipe being connected to the outdoor unit output port, and the fifth connecting pipe being connected to the outdoor unit input port; and an outdoor heat exchanger, having both ends respectively connected to the fourth connecting pipe and the sixth connecting pipe.

The outdoor unit according to the present disclosure is provided with the above-mentioned six-way directional valve, thus reducing the cost of the outdoor unit at least to some extent, simplifying the connection of pipes in the outdoor unit, optimizing a structure of the outdoor unit, and improving the connection reliability of the outdoor unit.

The air conditioner according to the present disclosure includes the above-mentioned outdoor unit.

The air conditioner according to the present disclosure is provided with the above-mentioned outdoor unit, thus not only reducing the cost of the air conditioner to some extent, but also simplifying the connection of the pipes in the outdoor unit, optimizing the structure of the outdoor unit, and improving the connection reliability of the outdoor unit.

REFERENCE NUMERALS outdoor unit for an air conditioner 1000;
six-way directional valve 100; valve body 1; first side wall 11; second side wall 12; first connecting pipe A; second connecting pipe B; third connecting pipe C; fourth connecting pipe D; fifth connecting pipe E; sixth connecting pipe F; valve spool 2; first chamber 21; second chamber 22; third chamber 23; barrier block 24; sliding block 25; connecting rod 26; valve chamber 3; pilot valve assembly 4; valve cavity 5;
outdoor unit output port 200;
outdoor unit input port 300;
compressor 400; air exhaust port 401; air return port 402;
outdoor heat exchanger 500;
L left; R right;

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In the description of the present disclosure, unless specified or limited otherwise, the terms "mounted," "connected," and "coupled" and variations thereof should be used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

A six-way directional valve 100 according to embodiments of the present disclosure will be described in the following with reference to drawings, which may be applied to an outdoor unit for an air conditioner 1000, when the outdoor unit 1000 and an indoor unit for an air conditioner together form an air conditioner, the six-way directional valve 100 can control directions in the air conditioner to achieve a switch between different modes, so as to facilitate adjusting a flowing direction of a refrigerant in a refrigerant flow path.

Figure 1:
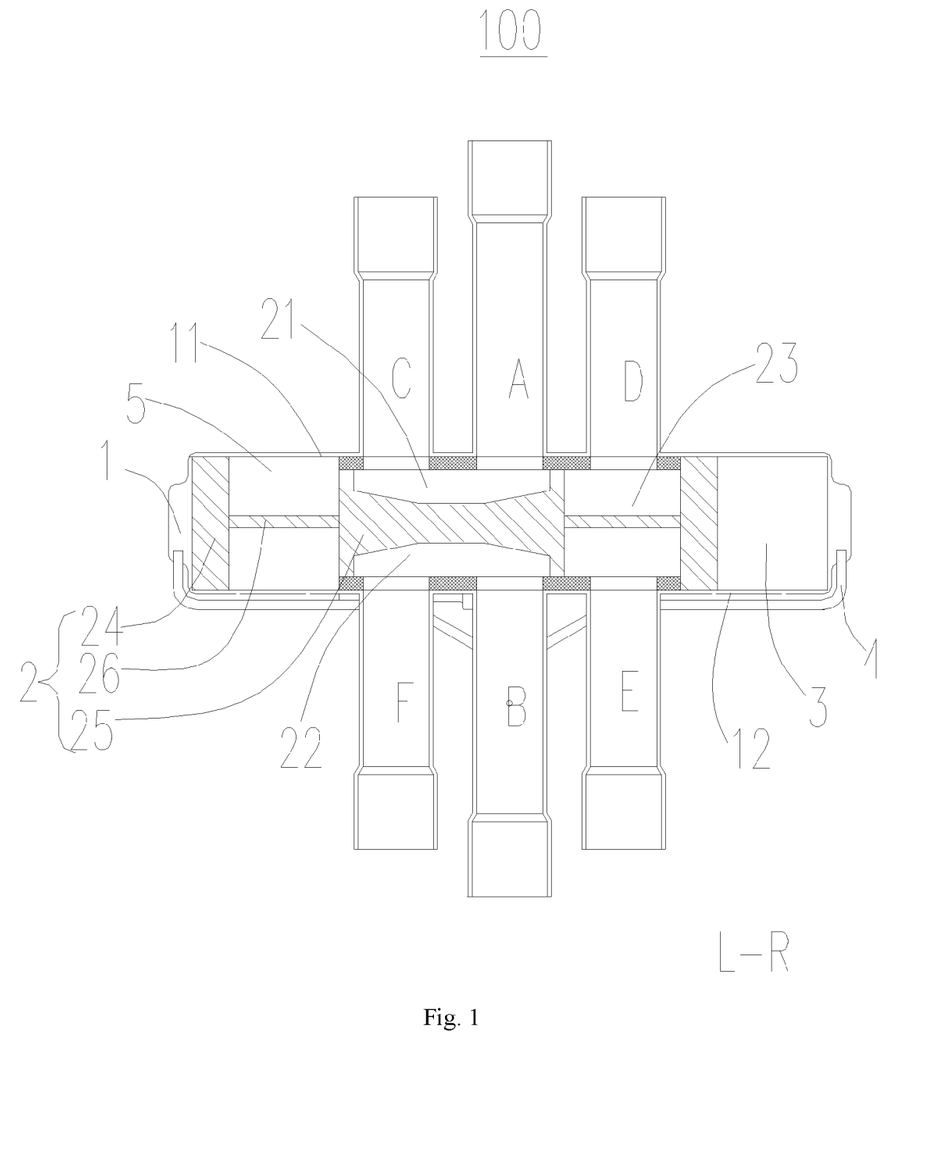
FIG. 1 is a schematic view of a six-way directional valve according to embodiments of the present disclosure before directional control.
Figure 2:
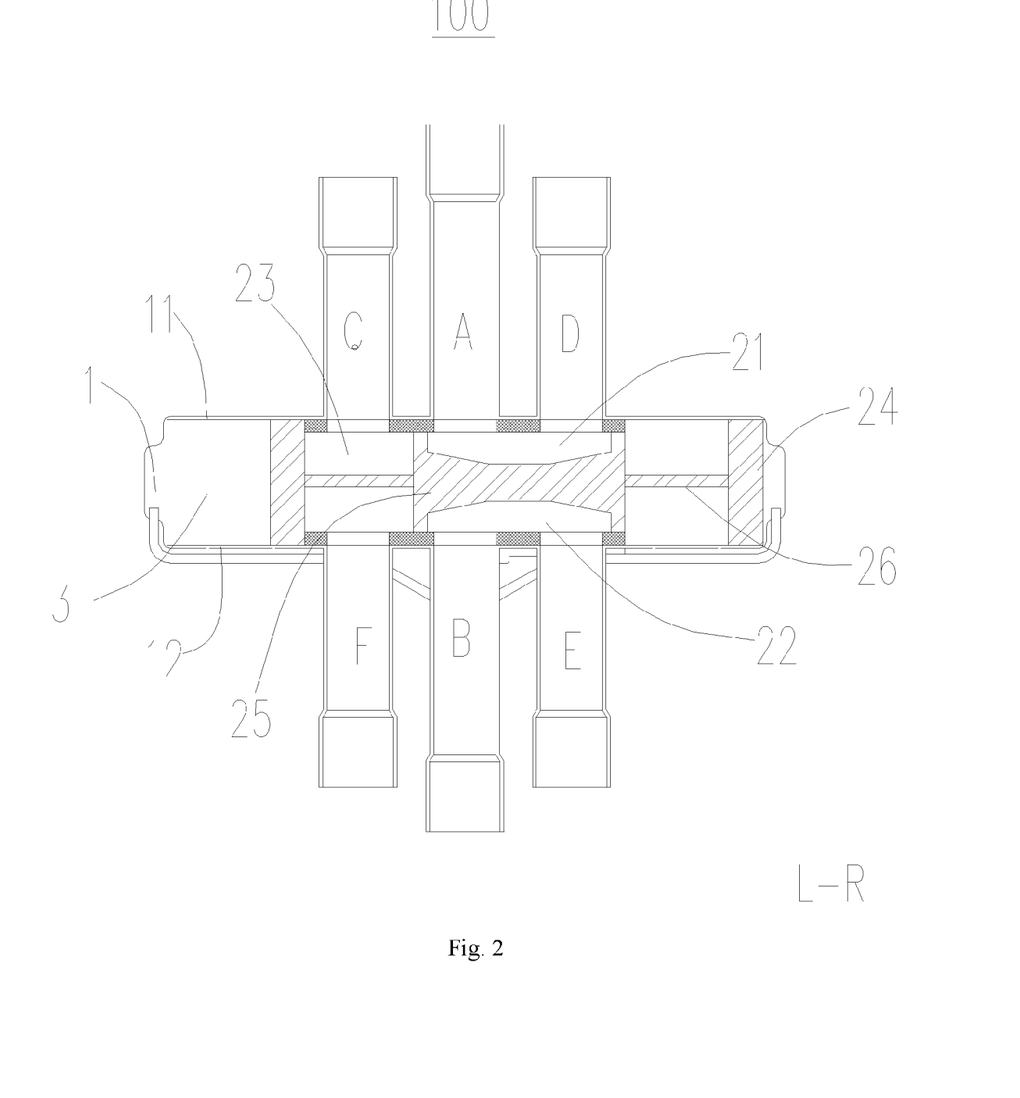
FIG. 2 is a schematic view of the six-way directional valve after directional control.

As shown in FIGS. 1-2, the six-way directional valve 100 according to the embodiments of the present disclosure may include a valve body 1, a valve spool 2 and a pilot valve assembly 4. In which, the valve body 1 defines a valve cavity 5 therein, the valve cavity 5 has a first side wall 11 and a second side wall 12 disposed oppositely to each other, the valve body 1 is provided with a first connecting pipe A, a second connecting pipe, a third connecting pipe, a fourth connecting pipe, a fifth connecting pipe and a sixth connecting pipe F, the first connecting pipe A to the sixth connecting pipe F may be respectively communicated with other pipes in the outdoor unit 1000, so as to facilitate the circulation of the refrigerant.

The valve spool 2 is movably disposed in the valve cavity 5, that is, the valve spool 2 is movable in the valve cavity 5. Therefore, by moving the valve spool 2 in the valve cavity 5, a directional control function of the six-way directional valve 100 may be achieved, thus achieving the directional circulation of the refrigerant in the air conditioner.

Two valve chambers 3 are defined between two moving ends of the valve spool 2 and an inner circumferential walls of the valve cavity 5, so that the valve spool 2 is allowed to be driven to move by a pressure difference between the two valve chambers 3, that is, the movement of the valve spool 2 in the valve cavity 5 is driven by the pressure difference of the two valve chambers 3. Specifically, when the pressure in one valve chamber 3 of the two valve chambers 3 is relatively higher, the valve spool 2 is allowed to move towards the other valve chamber 3 which has a relatively lower pressure therein, eventually a pressure balance is reached, thus moving the valve spool 2 by this manner, thereby achieving the directional control function of the six-way directional valve 100.

The pilot valve assembly 4 is connected to the two valve chambers 3, so as to switch pressures in the two valve chambers 3. Optionally, the pilot valve assembly 4 may be connected to the two valve chambers 3 by a capillary tube, so as to switch the pressures in the two valve chambers 3. For example, when the air conditioner needs to be switched between a refrigeration mode and a heating mode, the pilot valve assembly 4 switches the pressures in the two valve chambers 3, the valve spool 2 is allowed to move towards the valve chamber 3 having a lower pressure, thus achieving the directional control of the six-way directional valve 100, and changing the circulation direction of the refrigerant by this, thereby achieving a refrigeration function or heating function of the air conditioner.

A first chamber 21 is defined between the valve spool 2 and the first side wall 11, a second chamber 22 is defined between the valve spool 2 and the second side wall 12, and a third chamber 23 is defined between the valve spool 2, the first side wall 11 and the second side wall 12. The first connecting pipe A is normally communicated with the first chamber 21, and the second connecting pipe B is normally communicated with the second chamber 22. That is, no matter whether a direction of the six-way directional valve 100 is controlled or not, the first connecting pipe A is always communicated with the first chamber 21, and the second connecting pipe B is always communicated with the second chamber 22.

The valve spool 2 moves so that one of the third connecting pipe C and the fourth connecting pipe D is communicated with the first chamber 21, and the other one is communicated with the third chamber 23. One of the fifth connecting pipe E and the sixth connecting pipe F is communicated with the second chamber 22, and the other one is communicated with the third chamber 23. That is, when the valve spool 2 moves so that the third connecting pipe C is communicated with the first chamber 21, the fourth chamber D and the fifth chamber E are communicated with the third chamber 23, and the sixth connecting pipe F is communicated with the second chamber 22. When the valve spool 2 moves so that the fourth connecting pipe D is communicated with the first chamber 21, the third connecting pipe C and the sixth connecting pipe F are communicated with the third chamber 23, and the fifth connecting pipe E is communicated with the second chamber 22.

Specifically, the pilot valve assembly 4 switches the pressures in the two valve chambers 3, so that the valve spool 2 moves towards the valve chamber 3 having a lower pressure. For example, as shown in FIG. 1, when the valve spool 2 moves to the left, no direction control is carried out on the six-way directional valve 100, at this moment, the first connecting pipe A and the third connecting pipe C are communicated with the first chamber 21, the second connecting pipe B and the sixth connecting pipe F are communicated with the second chamber 22, and the fourth connecting pipe D and the fifth connecting pipe E are communicated with the third chamber 23. When the valve spool 2 moves to the right, direction control is carried out on the six-way directional valve 100, at this moment, the first connecting pipe A and the fourth connecting pipe D are communicated with the first chamber 21, the second connecting pipe B and the fifth connecting pipe E are communicated with the second chamber 22, and the third connecting pipe C and the sixth connecting pipe F are communicated with the third chamber 23. It should be understood that, description of left and right movements of the valve spool 2 are just explanatory description according to FIG. 1-FIG. 2, and shall not be construed as a limit to the valve spool 2. In order to facilitate the description, the movements of the valve spool 2 mentioned in below are all explanatively described by the left or right movement.

It should be noted that, for facilitating clearly describing the directional principle of the six-way directional valve 100, the six-way directional valve 100 will be described in the following accompanying an indoor unit for an air conditioner and an air conditioner.

Figure 3:
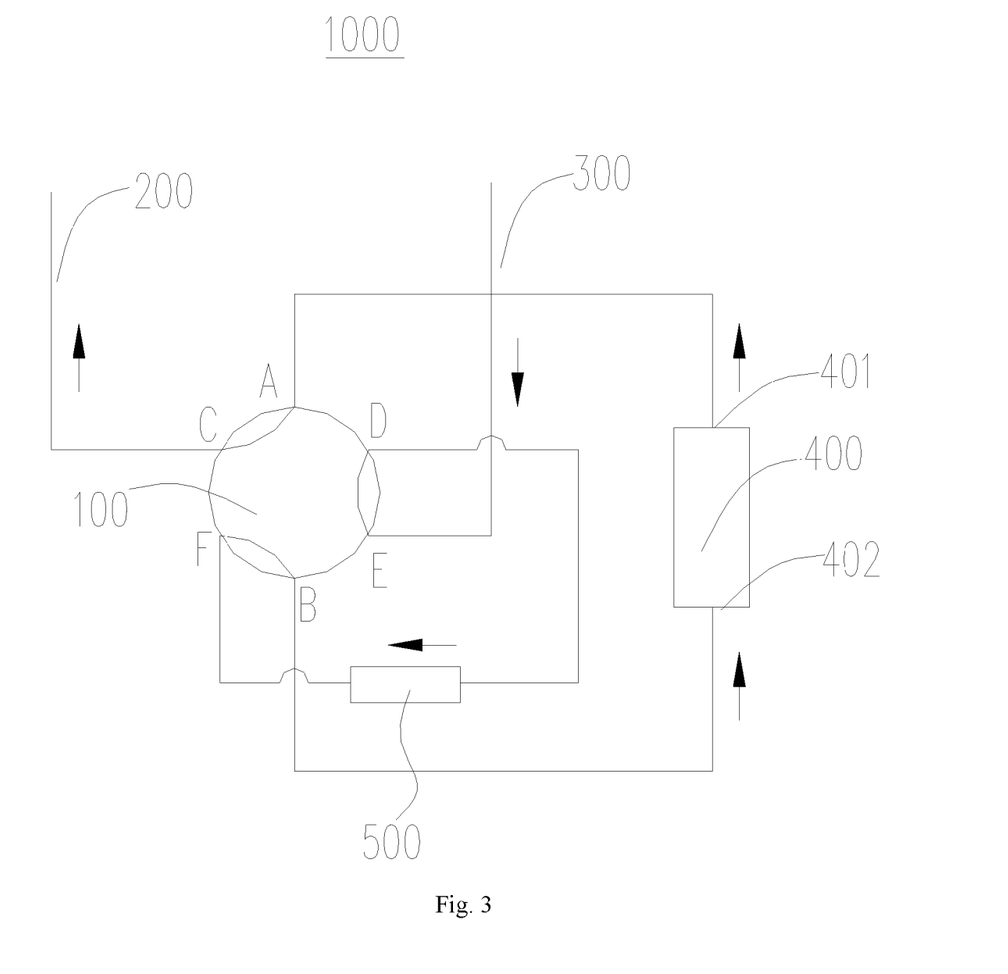
FIG. 3 is a schematic diagram of an outdoor unit for an air conditioner according to embodiments of the present disclosure when it heats.
Figure 4:
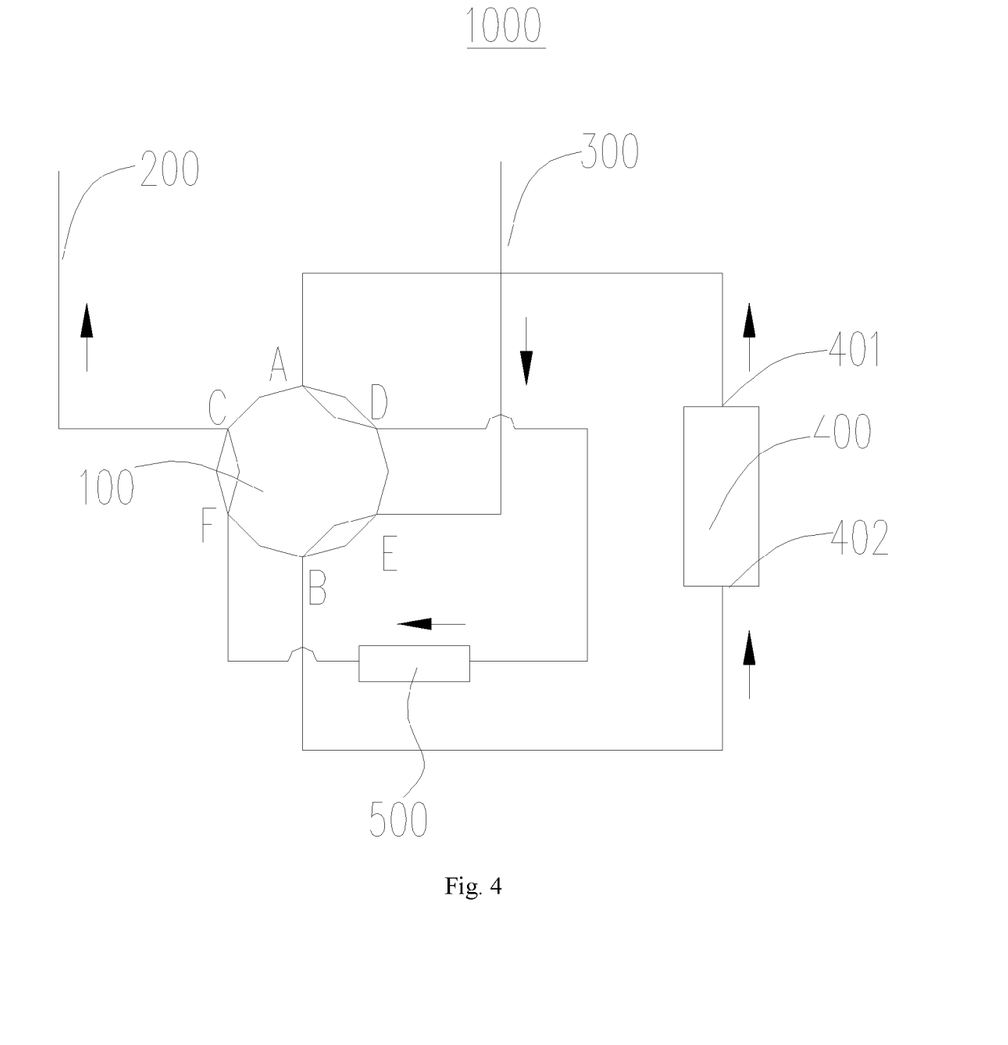
FIG. 4 is a schematic diagram of an outdoor unit for an air conditioner according to embodiments of the present disclosure when it refrigerates.

The outdoor unit 1000 according to the embodiments of the present disclosure has an outdoor unit output port 200 and an outdoor unit input port 300, and the indoor unit is connected between the outdoor unit output port 200 and the outdoor unit input port 300. The outdoor unit 1000 may include a compressor 400, the above-mentioned six-way directional valve 100 and an outdoor heat exchanger 500.

Specifically, the compressor 400 has an air exhaust port 401 and an air return port 402, the refrigerant enters the compressor 400 via the air return 402 and has a high temperature and high pressure after being compressed by the compressor 400, and then is exhausted from the air exhaust port 401. It should be noted that, structures and operation principles of the compressor 400 are both existing technologies, which will not be described in detail herein.

The first connecting pipe A is connected to the air exhaust port 401, the second connecting pipe B is connected to the air return port 402, the third connecting pipe C is connected to the outdoor unit output port 200, and the fifth connecting pipe E is connected to the outdoor unit input port 300, thus making the six-way directional valve 100 communicate with the refrigerant flow path in the outdoor unit 1000, so as to facilitate the switch of the flowing direction of the refrigerant.

Two ends of the outdoor heat exchanger 500 are connected to the fourth connecting pipe D and the sixth connecting pipe F respectively, thus connecting the outdoor heat exchanger 500 in the refrigerant circulation path, so that the refrigerant flows through the outdoor heat exchanger 500 to exchange heat with the outdoor environment.

Specifically, as shown in FIG. 1 and FIG. 3, when the air conditioner is in the heating mode, the pilot valve assembly 4 switches the pressures in the two valve chambers 3, so that the valve spool 2 moves to the left, at the moment the first connecting pipe A and the third connecting pipe C are communicated with the first chamber 21, the second connecting pipe B and the sixth connecting pipe F are communicated with the second chamber 22, and the fourth connecting pipe D and the fifth connecting pipe E are communicated with the third chamber 23. The refrigerant having a high pressure and high temperature exhausted from the exhaust port 401 of the compressor 400 enters the first chamber 21 through the first connecting pipe A, then flows out from the third connecting pipe C to the indoor unit through the outdoor unit output port 200, and exchanges heat with the indoor environment in the indoor unit. The refrigerant exhausted from the indoor unit enters the third chamber 23 through the outdoor unit input port 300 and the fifth connecting pipe E, subsequently flows out from the fourth connecting pipe D to the outdoor heat exchanger 500, and exchanges heat with the outdoor environment in the outdoor heat exchanger 500. Then the refrigerant enters the second chamber 22 through the sixth connecting pipe F after flowing out from the outdoor heat exchanger 500, then flows out through the second connecting pipe B, and returns to the compressor 400 through the air return port 402 of the compressor 400. The refrigerant circulates like this to form the heating circulation.

As shown in FIG. 2 and FIG. 4, when the air conditioner is in the refrigeration mode, the pilot valve assembly 4 switches the pressures in the two valve chambers 3, so that the valve spool 2 moves to the right, at the moment the first connecting pipe A and the fourth connecting pipe D are communicated with the first chamber 21, the second connecting pipe B and the fifth connecting pipe E are communicated with the second chamber 22, and the third connecting pipe C and the sixth connecting pipe F are communicated with the third chamber 23. The refrigerant having a high pressure and high temperature exhausted from the exhaust port 401 of the compressor 400 enters the first chamber 21 through the first connecting pipe A, then flows out from the fourth connecting pipe D, enters the outdoor heat exchanger 500, and exchanges heat with the outside environment in the outdoor heat exchanger 500. The refrigerant enters into the third chamber 23 through the sixth connecting pipe F after flowing out from the outdoor heat exchanger 500, subsequently flows out from the third connecting pipe C to the indoor unit through the outdoor unit output port 200, and exchanges heat with the indoor environment in the indoor unit. The refrigerant flowing out from the indoor unit enters the second chamber 22 through the outdoor unit input port 300 and the fifth connecting pipe E, then flows out from the second connecting pipe B, and returns to the compressor 400 through the air return port 402 of the compressor 400. The refrigerant circulates like this to form the refrigeration circulation.

The six-way directional valve 100 according to embodiments of the present disclosure is provided with the first connecting pipe A to the sixth connecting pipe F, and the valve spool 2 is movably disposed in the valve cavity 5 to achieve the directional control function of the six-way directional valve 100, thus avoiding the use of a plurality of four-way valves in the outdoor unit 1000 for an air conditioner to achieve the same effect as the six-way directional valve 100, which reduces the cost of the directional valve to some extent and simplifies the connection of the pipes in the outdoor unit 1000 for an air conditioner.

The outdoor unit 1000 for an air conditioner according to embodiments of the present disclosure is provided with the above-mentioned six-way directional valve 100, thus reducing the cost of the outdoor unit 1000 at least to some extent, simplifying the connection of the pipes in the outdoor unit 1000, optimizing a structure of the outdoor unit 1000, and improving connection reliability of the outdoor unit 1000.

According to some embodiments of the present disclosure, the first connecting pipe A, the third connecting pipe C and the fourth connecting pipe D are disposed to the first side wall 11, and the second connecting pipe B, the fifth connecting pipe E and the sixth connecting pipe F are disposed to the second side wall 12, thus facilitating communications between the first connecting pipe A to the sixth connecting pipe F and the corresponding first chamber 21 to the third chamber 23 respectively, so as to achieve the directional control of the six-way directional valve 100.

In some embodiments of the present disclosure, the valve spool 2 includes two barrier blocks 24 spaced apart from each other and a sliding block 25. In which, two valve chambers 3 are defined between the two barrier blocks 24 and the circumferential wall of the valve cavity 5, thereby facilitating movement of the valve spool 2 to achieve the directional control of the six-way directional valve 100, and changing the flowing direction of the refrigerant in the air conditioner.

The sliding block 25 is disposed between the two barrier blocks 24, the sliding block 25 is connected to the two barrier blocks 24 through a connecting rod 26, the first chamber 21 is defined between the sliding block 25 and the first side wall 11, the second chamber 22 is defined between the sliding block 25 and the second side wall 12, and the third chamber 23 is defined between the sliding block 25, two connecting rods 26, the two barrier blocks 24 and the inner circumferential wall of the valve cavity 5. Specifically, after the pilot valve assembly 4 switches the pressures in the two valve chambers 3, the valve chamber 3 having a higher pressure drives the barrier blocks 24 and the barrier blocks 24 drive the sliding block 25 to move towards the valve chamber 3 having a lower pressure, so that the first chamber 21, the second chamber 22 and the third chamber 23 are communicated with the corresponding first connecting pipe to the sixth connecting pipe A-F respectively, thereby achieving the directional control of the six-way directional valve 100, thus adjusting the flowing direction of the refrigerant in the refrigerant circulation path.

Optionally, the two barrier blocks 24, the sliding block 25 and the two connecting rods 26 are configured as an integrally formed member, thus not only facilitating the production, processing and manufacturing of the barrier blocks 24, the sliding block 25 and the two connecting rods 26, but also saving the production cost of the valve spool 2, in the meanwhile the connection strength between the barrier blocks 24, the sliding block 25 and the two connecting rods 26 may be improved to some extent, and the service life of the valve 2 can be prolonged.

Optionally, the valve body 1 has a circular cross section, thereby facilitating the communication between the six-way directional valve 100 and other pipes in the outdoor unit 1000 for an air conditioner.

The air conditioner according to embodiments of the present disclosure includes the above-mentioned outdoor unit 1000.

The air conditioner according to embodiments of the present disclosure is provided with the above-mentioned outdoor unit 1000, thus not only reducing the cost of the air conditioner to some extent, but also simplifying the connection of pipes in the outdoor unit 1000, optimizing a structure of the outdoor unit 1000, and improving the connection reliability of the outdoor unit 1000.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A six-way directional valve comprising:
   a valve body, defining a valve cavity therein, the valve cavity having a first side wall and a second side wall disposed oppositely to each other, and the valve body being provided with a first connecting pipe, a second connecting pipe, a third connecting pipe, a fourth connecting pipe, a fifth connecting pipe and a sixth connecting pipe;
   a valve spool, movably disposed in the valve cavity, wherein two valve chambers being defined between two moving ends of the valve spool and an inner circumferential wall of the valve cavity, so that the valve spool is driven to move by a pressure difference between the two valve chambers, a first chamber is defined between the valve spool and a first side wall, a second chamber is defined between the valve spool and a second side wall, a third chamber is defined between the valve spool, the first side wall and the second side wall, the first connecting pipe is normally communicated with the first chamber, the second connecting pipe is normally communicated with the second chamber, the valve spool moves so that one of the third connecting pipe and the fourth connecting pipe is communicated with the first chamber and the other one is communicated with the third chamber, and one of the fifth connecting pipe and the sixth connecting pipe is communicated with the second chamber and the other one is communicated with the third chamber; and a pilot valve assembly, communicated with the two valve chambers, so as to switch pressures in the two valve chambers.

2. The six-way directional valve according to claim 1, wherein the first connecting pipe, the third connecting pipe and the fourth connecting pipe are disposed to the first side wall, and the second connecting pipe, the fifth connecting pipe and the sixth connecting pipe are disposed to the second side wall.

3. The six-way directional valve according to claim 1, wherein the valve spool comprises:

two barrier blocks spaced apart from each other, the two valve chambers being defined between the two barrier blocks and the inner circumferential wall of the valve cavity respectively; and a sliding block, disposed between the two barrier blocks and connected to the two barrier blocks through a connecting rod, the first chamber being defined between the sliding block and the first side wall, the second chamber being defined between the sliding block and the second side wall, and the third chamber being defined between the sliding block, two connecting rods, the two barrier blocks and the inner circumferential wall of the valve cavity.

4. The six-way directional valve according to claim 3, wherein the two barrier blocks, the sliding block and the two connecting rods are configured as an integrally formed member.

5. The six-way directional valve according to claim 1, wherein the valve body has a circular cross section.

6. The six-way directional valve according to claim 2, wherein the valve spool comprises:

two barrier blocks spaced apart from each other, the two valve chambers being defined between the two barrier blocks and the inner circumferential wall of the valve cavity respectively; and a sliding block, disposed between the two barrier blocks and connected to the two barrier blocks through two connecting rods, the first chamber being defined between the sliding block and the first side wall, the second chamber being defined between the sliding block and the second side wall, and the third chamber being defined between the sliding block, the two connecting rods, the two barrier blocks and the inner circumferential wall of the valve cavity.

7. The six-way directional valve according to claim 6, wherein the two barrier blocks, the sliding block and the two connecting rods are configured as an integrally formed member.

8. The six-way directional valve according to claim 2, wherein the valve body has a circular cross section.

9. The six-way directional valve according to claim 3, wherein the valve body has a circular cross section.

10. The six-way directional valve according to claim 4, wherein the valve body has a circular cross section.

11. The six-way directional valve according to claim 6, wherein the valve body has a circular cross section.

12. The six-way directional valve according to claim 7, wherein the valve body has a circular cross section.

13. An outdoor unit for an air conditioner, having an outdoor unit output port and an outdoor unit input port, wherein the outdoor unit comprises:

a compressor, having an air exhaust port and an air return port;

a six-way directional valve comprising:

a valve body, defining a valve cavity therein, the valve cavity having a first side wall and a second side wall disposed oppositely to each other, and the valve body being provided with a first connecting pipe, a second connecting pipe, a third connecting pipe, a fourth connecting pipe, a fifth connecting pipe and a sixth connecting pipe, a valve spool, movably disposed in the valve cavity, wherein two valve chambers being defined between two moving ends of the valve spool and an inner circumferential wall of the valve cavity, so that the valve spool is driven to move by a pressure difference between the two valve chambers, a first chamber is defined between the valve spool and a first side wall, a second chamber is defined between the valve spool and a second side wall, a third chamber is defined between the valve spool, the first side wall and the second side wall, the first connecting pipe is normally communicated with the first chamber, the second connecting pipe is normally communicated with the second chamber, the valve spool moves so that one of the third connecting pipe and the fourth connecting pipe is communicated with the first chamber and the other one is communicated with the third chamber, and one of the fifth connecting pipe and the sixth connecting pipe is communicated with the second chamber and the other one is communicated with the third chamber, and a pilot valve assembly, communicated with the two valve chambers, so as to switch pressures in the two valve chambers, the first connecting pipe being connected to the air exhaust port, the second connecting pipe being connected to the air return port, the third connecting pipe being connected to the outdoor unit output port, and the fifth connecting pipe being connected to the outdoor unit input port; and an outdoor heat exchanger, having two ends connected to the fourth connecting pipe and the sixth connecting pipe respectively.

14. The outdoor unit according to claim 13, wherein the first connecting pipe, the third connecting pipe and the fourth connecting pipe are disposed to the first side wall, and the second connecting pipe, the fifth connecting pipe and the sixth connecting pipe are disposed to the second side wall.

15. The outdoor unit according to claim 13, wherein the valve spool comprises:

two barrier blocks spaced apart from each other, the two valve chambers being defined between the two barrier blocks and the inner circumferential wall of the valve cavity respectively; and a sliding block, disposed between the two barrier blocks and connected to the two barrier blocks through two connecting rods, the first chamber being defined between the sliding block and the first side wall, the second chamber being defined between the sliding block and the second side wall, and the third chamber being defined between the sliding block, the two connecting rods, the two barrier blocks and the inner circumferential wall of the valve cavity.

16. The outdoor unit according to claim 15, wherein the two barrier blocks, the sliding block and the two connecting rods are configured as an integrally formed member.

17. The outdoor unit according to claim 14, wherein the valve spool comprises:
  two barrier blocks spaced apart from each other, the two valve chambers being defined between the two barrier blocks and the inner circumferential wall of the valve cavity respectively; and
  a sliding block, disposed between the two barrier blocks and connected to the two barrier blocks through two connecting rods, the first chamber being defined between the sliding block and the first side wall, the second chamber being defined between the sliding block and the second side wall, and the third chamber being defined between the sliding block, the two connecting rods, the two barrier blocks and the inner circumferential wall of the valve cavity.

18. The outdoor unit according to claim 17, wherein the two barrier blocks, the sliding block and the two connecting rods are configured as an integrally formed member.

19. The outdoor unit according to claim 13, wherein the valve body has a circular cross section.

20. An air conditioner comprising an outdoor unit having an outdoor unit output port and an outdoor unit input port, wherein the outdoor unit comprises:
  a compressor, having an air exhaust port and an air return port;
  a six-way directional valve comprising:
  a valve body, defining a valve cavity therein, the valve cavity having a first side wall and a second side wall disposed oppositely to each other, and the valve body being provided with a first connecting pipe, a second connecting pipe, a third connecting pipe, a fourth connecting pipe, a fifth connecting pipe and a sixth connecting pipe,
  a valve spool, movably disposed in the valve cavity, wherein two valve chambers being defined between two moving ends of the valve spool and an inner circumferential wall of the valve cavity, so that the valve spool is driven to move by a pressure difference between the two valve chambers, a first chamber is defined between the valve spool and a first side wall, a second chamber is defined between the valve spool and a second side wall, a third chamber is defined between the valve spool, the first side wall and the second side wall, the first connecting pipe is normally communicated with the first chamber, the second connecting pipe is normally communicated with the second chamber, the valve spool moves so that one of the third connecting pipe and the fourth connecting pipe is communicated with the first chamber and the other one is communicated with the third chamber, and one of the fifth connecting pipe and the sixth connecting pipe is communicated with the second chamber and the other one is communicated with the third chamber, and
  a pilot valve assembly, communicated with the two valve chambers, so as to switch pressures in the two valve chambers, the first connecting pipe being connected to the air exhaust port, the second connecting pipe being connected to the air return port, the third connecting pipe being connected to the outdoor unit output port, and the fifth connecting pipe being connected to the outdoor unit input port; and
  an outdoor heat exchanger, having two ends connected to the fourth connecting pipe and the sixth connecting pipe respectively.

\* \* \* \* \*